United States Patent
Mooney et al.

(10) Patent No.: US 11,273,876 B2
(45) Date of Patent: Mar. 15, 2022

(54) MULTIMODE TAILGATE ASSEMBLY (71) Applicant: Mahindra N.A. Tech Center, Auburn Hills, MI (US)

(72) Inventors: Robert Brady Mooney, Clarkston, MI (US); Tony Don Bulchak, Hazel Park, MI (US); Jasneet Kaur Jhita, Commerce Charter Township, MI (US)

(73) Assignee: Mahindra N.A. Tech Center, Auburn Hills, MI (US)

( * ) Notice: Subject to any disclaimer, the term of this patent is extended or adjusted under 35 U.S.C. 154(b) by 72 days.

(21) Appl. No.: 16/827,906

(22) Filed: Mar. 24, 2020

(65) Prior Publication Data

US 2021/0300482 A1 Sep. 30, 2021

(51) Int. Cl.
*B62D 33/027* (2006.01)
*B62D 33/03* (2006.01)
*B62D 33/033* (2006.01)
*B62D 33/037* (2006.01)
*B62D 33/02* (2006.01)

(52) U.S. Cl.
CPC ......... *B62D 33/0273* (2013.01); *B62D 33/02* (2013.01); *B62D 33/033* (2013.01); *B62D 33/037* (2013.01)

(58) Field of Classification Search
CPC .. B62D 33/027; B62D 33/0273; B62D 33/03; B62D 33/033; B62D 33/037
USPC ............. 296/50, 51, 53, 56, 57.1, 58, 59, 60
See application file for complete search history.

(56) References Cited

U.S. PATENT DOCUMENTS

| | | | | |
|---|---|---|---|---|
| 4,029,355 A | * | 6/1977 | Wilhelmsen | B62D 33/0273 296/57.1 |
| 4,372,601 A | * | 2/1983 | Smith | B60J 5/103 296/50 |
| 5,352,008 A | * | 10/1994 | Denvir | B62D 33/0273 296/180.1 |
| 5,468,037 A | * | 11/1995 | Peterson | B62D 33/0273 296/57.1 |
| 5,678,876 A | * | 10/1997 | Sargent | B60J 5/125 296/52 |
| 8,740,279 B1 | * | 6/2014 | McGoff | E05B 83/20 296/51 |
| 2002/0070575 A1 | * | 6/2002 | Leftridge | B60J 7/041 296/56 |
| 2003/0001403 A1 | * | 1/2003 | Mizuta | B62D 33/037 296/57.1 |
| 2003/0122396 A1 | * | 7/2003 | Humphrey | B62D 33/0273 296/51 |
| 2009/0183433 A1 | * | 7/2009 | Cheung | B62D 33/0273 49/169 |
| 2009/0250959 A1 | * | 10/2009 | Townson | E05D 3/10 296/51 |
| 2009/0250961 A1 | * | 10/2009 | Townson | B62D 33/037 296/57.1 |

(Continued)

*Primary Examiner* — Gregory A Blankenship
(74) *Attorney, Agent, or Firm* — Harness, Dickey & Pierce, P.L.C.

(57) ABSTRACT

A cargo assembly is provided for use with a vehicle or trailer including a cargo area having a bed floor and a pair of sidewalls on opposite sides of the bed floor. The cargo area including an open end along an edge of the bed floor. A tailgate panel is disposed in the open end and includes first and second side edges having an upper connection mechanism and a lower connection mechanism that are each releasably and pivotally engaged with the pair of sidewalls.

23 Claims, 10 Drawing Sheets

(56) References Cited

U.S. PATENT DOCUMENTS

| | | | | |
|---|---|---|---|---|
| 2009/0250962 | A1* | 10/2009 | Polewarczyk | B60P 7/14 296/57.1 |
| 2010/0181795 | A1* | 7/2010 | Papanikolaou | B62D 33/037 296/52 |
| 2012/0139281 | A1* | 6/2012 | Cousino | B60P 1/435 296/61 |
| 2020/0148283 | A1* | 5/2020 | Robinson | B62D 33/03 |
| 2021/0147007 | A1* | 5/2021 | Sodhi | B60J 5/108 |

\* cited by examiner

Fig-12

MULTIMODE TAILGATE ASSEMBLY

FIELD

The present disclosure relates to a multi-mode tailgate system that can be used on a truck bed, a trailer, an off-road vehicle and the like.

BACKGROUND

This section provides background information related to the present disclosure which is not necessarily prior art.

Trucks, off-road vehicles and trailers are often provided with a cargo area that is used to haul materials. A tailgate assembly is typically provided at the rear of the cargo area to retain items within the cargo area and is openable to allow access to the cargo area. The functionality of the tailgate assembly has typically been limited. Therefore it is desirable to provide improved functionality for the tailgate assembly and to simplify the conversion of the tailgate assembly between various operating modes.

SUMMARY

This section provides a general summary of the disclosure, and is not a comprehensive disclosure of its full scope or all of its features.

A cargo assembly is provided for use with a vehicle or trailer including a cargo area having a bed floor and a pair of sidewalls on opposite sides of the bed floor. The cargo area including an open end along an edge of the bed floor. A tailgate panel is disposed in the open end and includes first and second side edges having an upper connection mechanism and a lower connection mechanism that are each releasably and pivotally engaged with the pair of sidewalls. According to a known aspect, the upper connection mechanisms can be released and the tailgate can be supported by side cables so that the tailgate is generally co-planar with the bed floor to allow for longer and larger materials and items to extend out of the cargo area.

According to a further aspect, the lower connection mechanisms can be released so that the tailgate panel is pivotable about the upper connection mechanisms so that the tailgate can be used in a spreader mode where material can be pushed out or dumped out of the cargo area along the bed floor. According to another aspect, the tailgate can be moved between a vertical position along the edge of the bed floor and a horizontal position disposed between the pair of sidewalls and directly above the bed so that the tailgate can be used as a horizontal surface which can be used for any work requiring such surface, referred to as a "workbench mode". According to a still further aspect, the upper connection mechanisms and the side cables can be released so that the tailgate can be suspended downward from the lower connection mechanisms to allow for easier loading or unloading of the cargo area under certain circumstances. According to another aspect, the upper and lower connection mechanisms and the side cables can be released so that the tailgate can be removed from the cargo area to allow for full and easy bed access.

The upper and lower connection mechanisms are designed for easy tool-less adjustment between the engaged and released conditions, and between the released and engaged conditions, to allow for easy manipulation of the tailgate assembly between all of the various operational modes.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
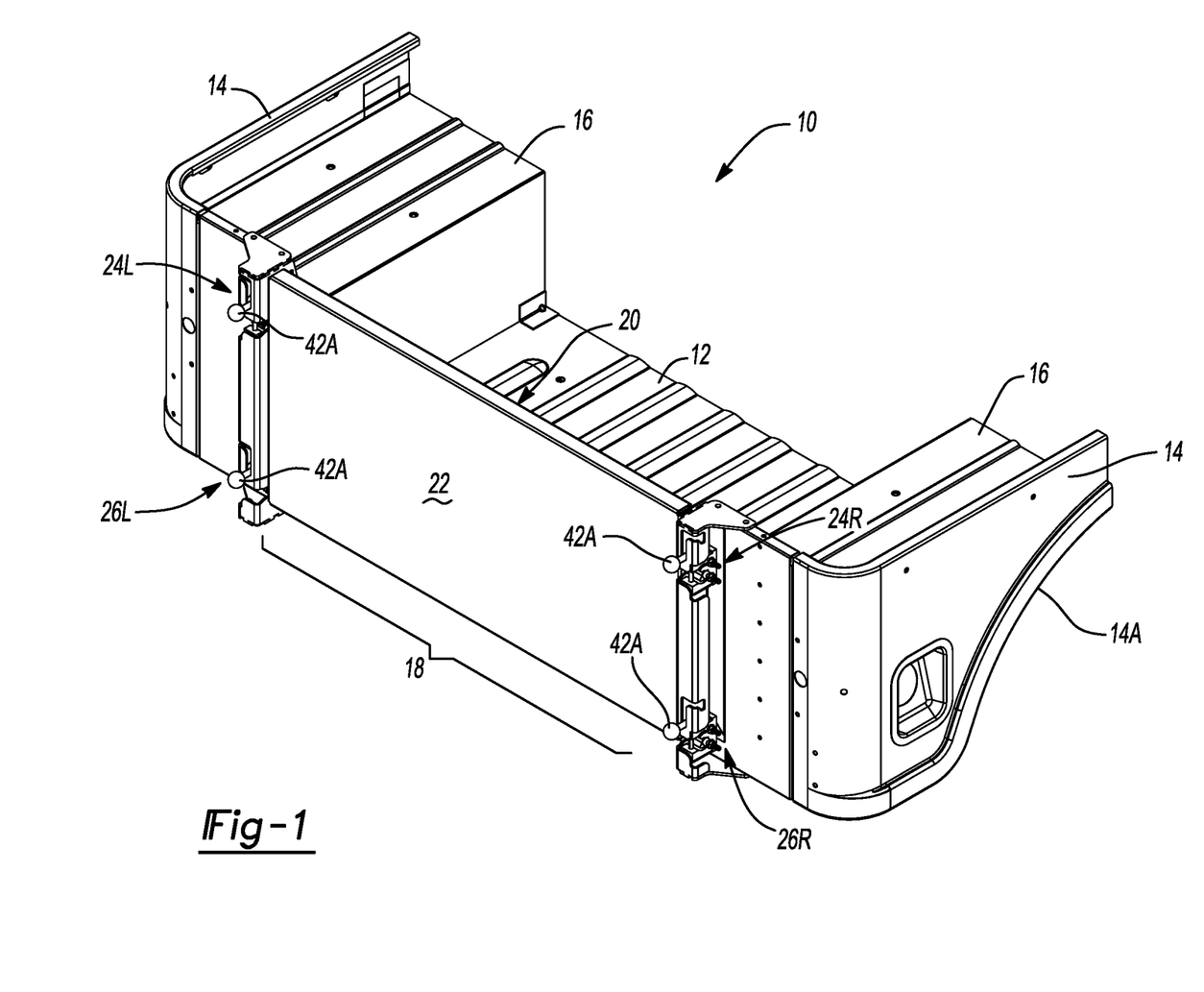
FIG. 1 is a perspective view of a tailgate assembly according to the principles of the present disclosure shown in a closed position.

With reference to FIG. 1, a portion of a cargo area 10 is shown that represents, for example, a cargo area of a pick-up truck, an off road vehicle, a trailer or a sport utility vehicle. The cargo area 10 can include a bed floor 12 and a pair of sidewalls 14 on opposite sides of the bed floor 12. The sidewalls 14 can include wheel well regions 14A that can define benches or shelves 16 within the cargo area 10. The cargo area 10 further includes an opening 18 disposed between the sidewalls 14 with a tailgate assembly 20 movably and removably disposed in the opening 18.

The tailgate assembly 20 can include a tailgate panel 22 in the form of a hollow panel made from sheet metal or other materials. The tailgate panel 22 can be supported to the sidewalls 14 by a pair of upper connection mechanisms 24L, 24R and a pair of lower connection mechanism 26L, 26R described in detail later herein. The tailgate assembly 20 can be movable between a variety of operational positions, including a closed position as shown in FIG. 1, with the upper and lower connection mechanisms 24L, 24R, 26L, 26R all being engaged.

Figure 2:
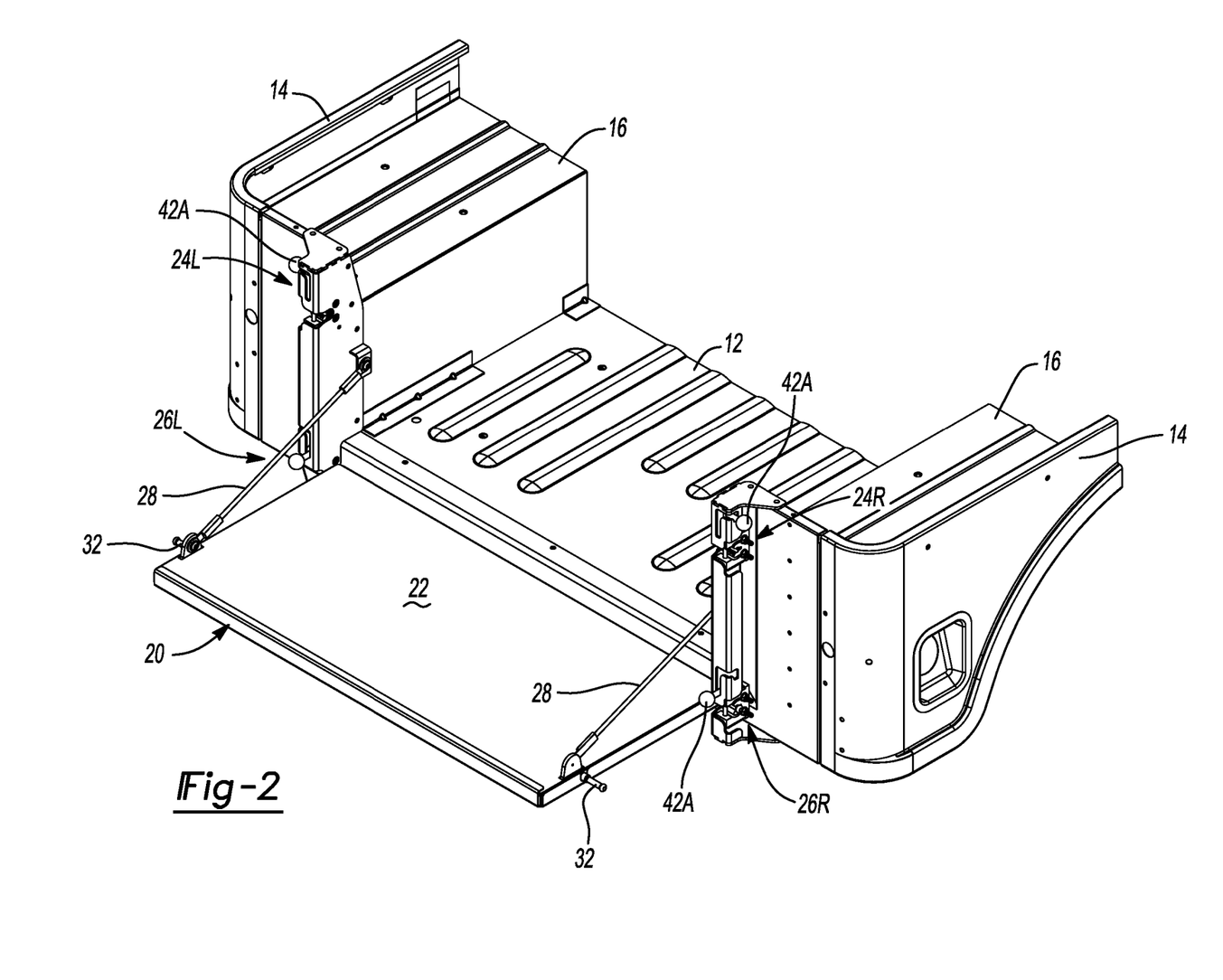
FIG. 2 is a perspective view of a tailgate assembly according to the principles of the present disclosure shown in an open position.

As shown in FIG. 2, the tailgate assembly 20 is provided in an open position with the pair of upper connection mechanisms 24L, 24R released and a pair of side cables 28 supporting the tailgate panel 22 generally coplanar with the bed floor 12.

Figure 3:
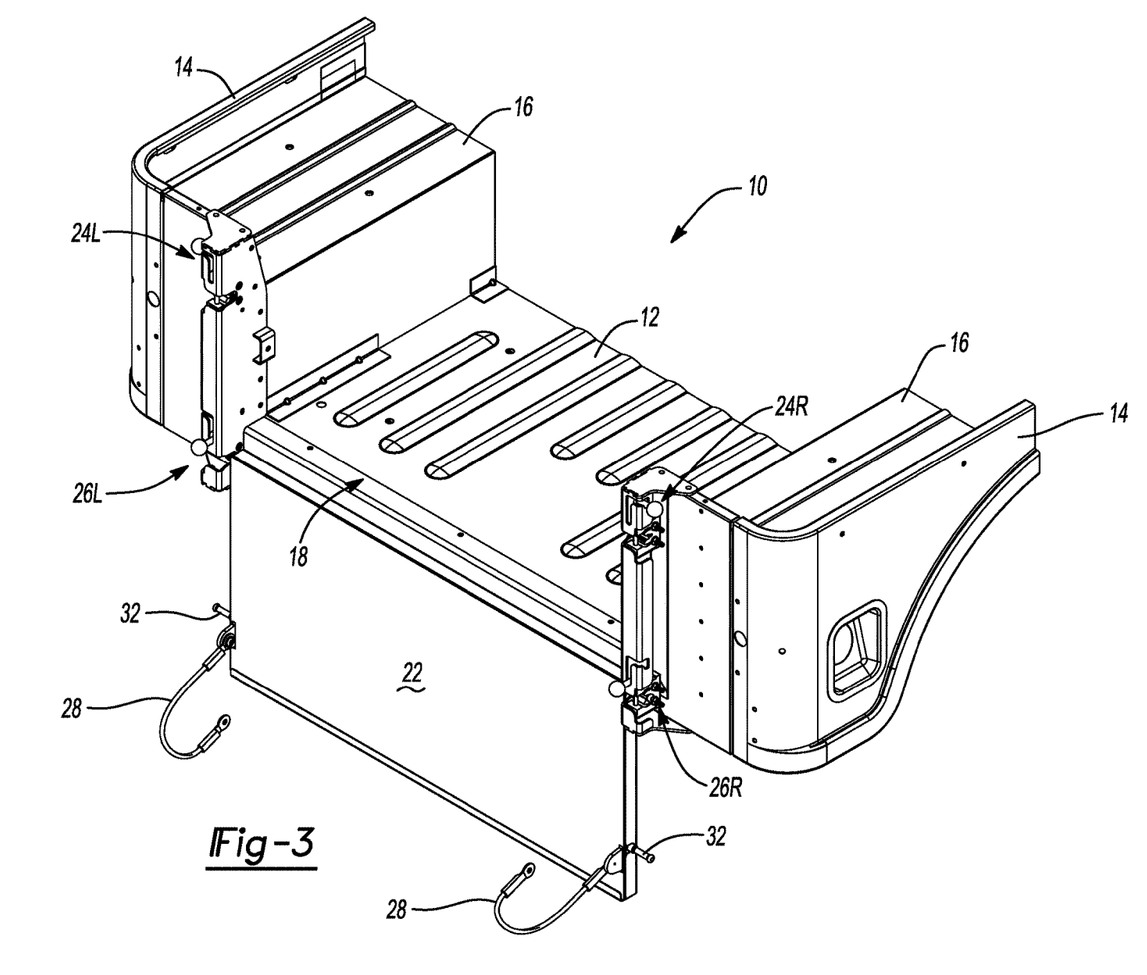
FIG. 3 is a perspective view of a tailgate assembly according to the principles of the present disclosure shown in a released position hanging below the cargo bed.

As shown in FIG. 3, the tailgate panel 22 is provided in a released position hanging below the cargo bed with the pair of upper connection mechanisms 24L, 24R and the pair of side cables 28 in a released position.

Figure 4:
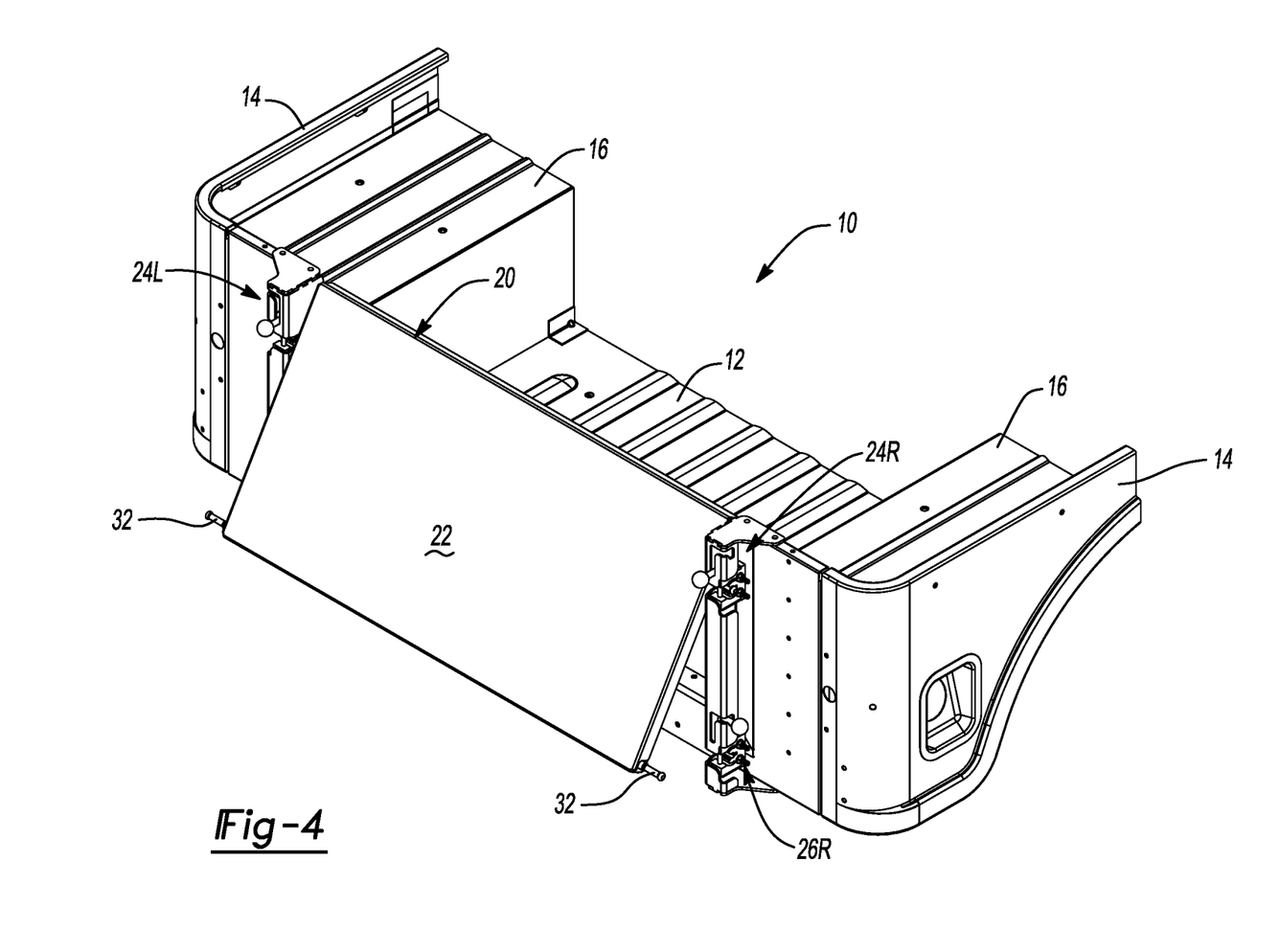
FIG. 4 is a perspective view of a tailgate assembly according to the principles of the present disclosure shown in a spreader mode with the bottom connection mechanisms released.

As shown in FIG. 4, the tailgate assembly 20 is provided in a with the bottom connection mechanisms 26L, 26R in a released positon allowing the bottom of the tailgate to swing open freely like a flap. With the bottom connection mechanisms 26L, 26R released, the material in the cargo bed 10 can be pushed out of the bottom of the cargo bed 10 and/or the cargo bed can be tiltable (i.e. with the front of the cargo bed 10 being raised and/or the rear of the cargo bed 10 being lowered) so that the material in the cargo bed 10 can be dumped out or more easily pushed out of the cargo bed 10.

Figure 5:
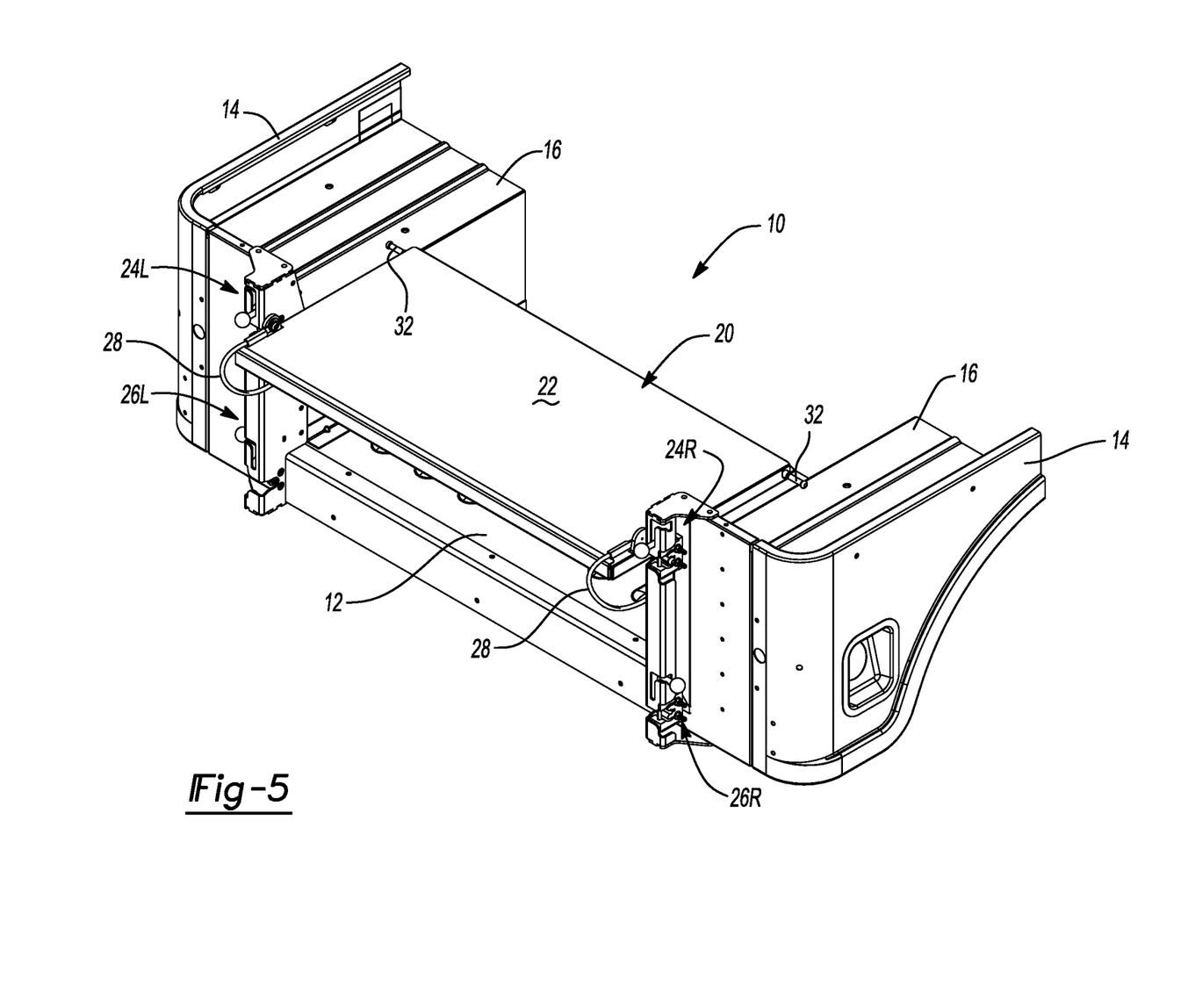
FIG. 5 is a perspective view of a tailgate assembly according to the principles of the present disclosure shown in a workbench/tabletop mode.

As shown in FIG. 5, the tailgate assembly 20 may also be utilized as a multipurpose, horizontal surface with the bottom connection mechanisms 26L, 26R in a released position and the tailgate panel 22 pivoted about the upper connection mechanisms 24L, 24R from the vertical position to a horizontal position disposed between the sidewalls 14 and above the floor bed 12 of the cargo area 10. The tailgate panel 22 can be supported by support pins 32 (further described herein) resting on the shelves 16.

Figure 6:
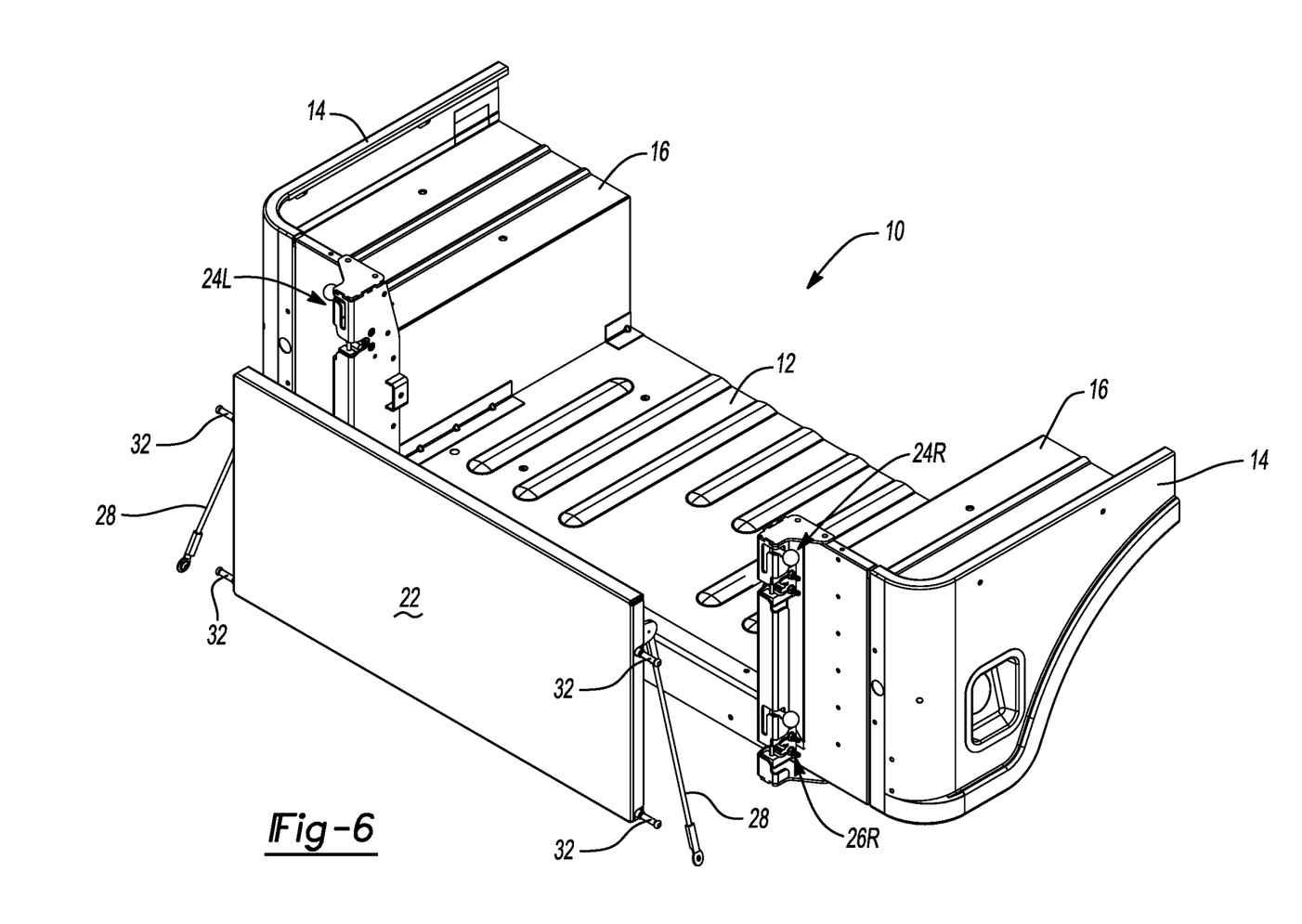
FIG. 6 is a perspective view of a tailgate assembly according to the principles of the present disclosure shown with the tailgate removed.

As shown in FIG. 6, the cargo area 10 is shown with the tailgate panel 22 removed with the pair of upper connection mechanisms 24L, 24R, the pair of lower connection mechanism 26L, 26R and the pair of side cables 28 in a released position.

Figure 7:
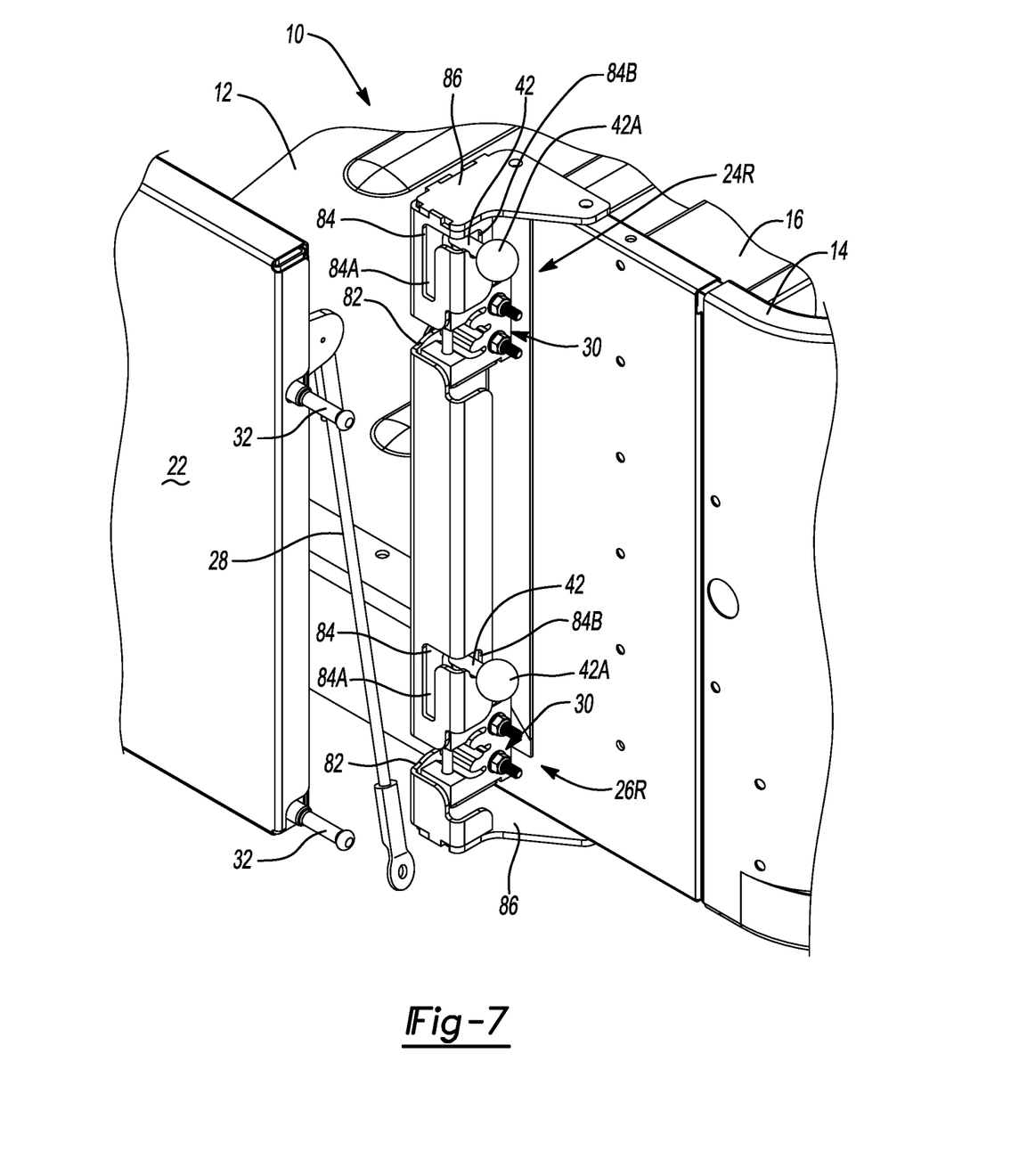
FIG. 7 is a detailed perspective view of the connection mechanisms of the tailgate assembly according to the principles of the present disclosure.
Figure 11:
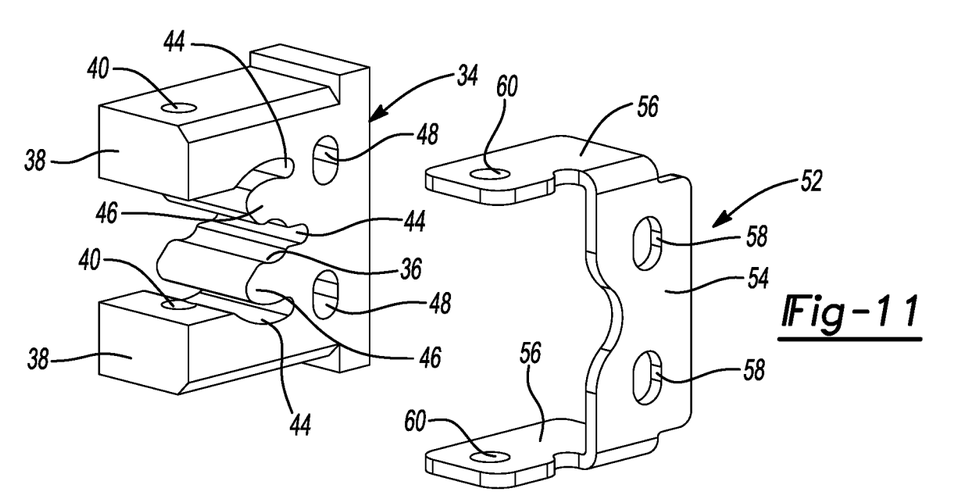
FIG. 11 is an exploded perspective view of components to the bracket assembly shown in FIG. 10.
Figure 12:
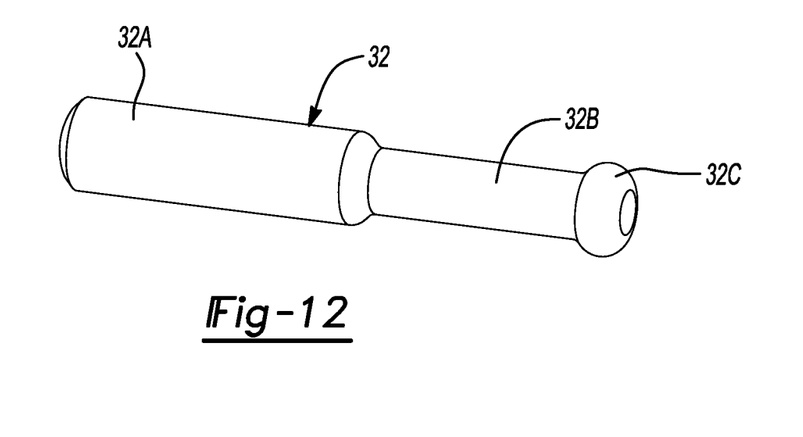
FIG. 12 is a perspective view of a mounting pin of the connection mechanisms of the present disclosure.

With reference to FIG. 7, the engagement of the upper and lower connection mechanisms 24R, 26R is illustrated. It should be understood that the connection mechanisms 24L, 26L on the left side of the tailgate assembly 20 are mirror images of the connection mechanisms 24R, 26R and therefore the connection mechanisms 24L, 26L will not be described in detail. The upper and lower connection mechanisms 24R, 26L each include a bracket assembly 30 (best shown in FIGS. 10 and 11) and a support pin 32 that is releasably engageable with the bracket assembly 30. The support pins 32, as best shown in FIG. 12, include a mounting portion 32A that is received in an aperture in the side of the tailgate panel 22 and a reduced diameter shaft portion 32B releasably engageable with the bracket assembly 30. As best shown in FIG. 12, an additional increased diameter knob 32C can be provided at an end of the shaft portion 32B to assist with alignment of the shaft portion with the bracket assembly 30.

Figure 9:
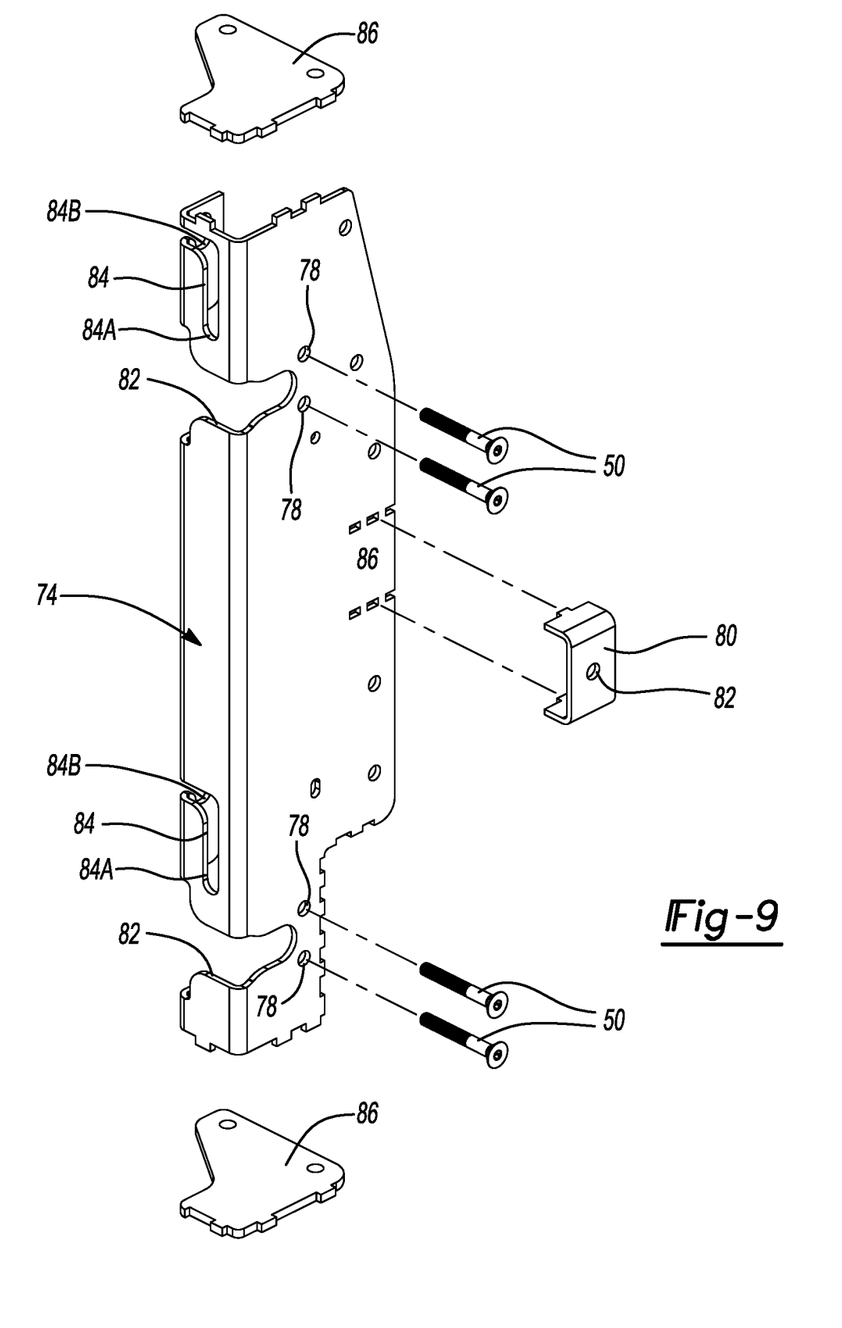
FIG. 9 is a detailed perspective view of a vertical section of the rear closeout subassembly according to the principles of the present disclosure.
Figure 10:
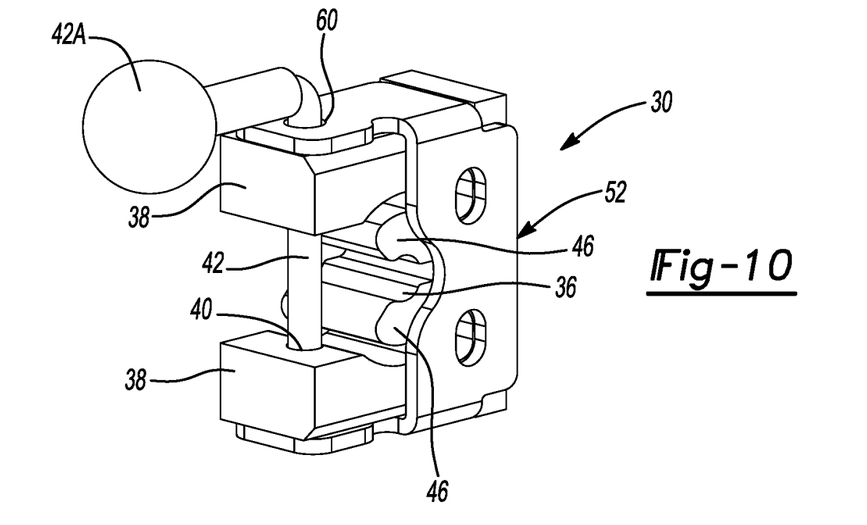
FIG. 10 is a detailed perspective view of a bracket assembly of the connection mechanisms of the present disclosure.

As best shown in FIG. 10, the bracket assembly 30 includes an anchor 34 that can be made from a plastic or an elastomeric material and defines a C-shaped channel 36 for receiving the reduced diameter shaft portion 32B of the support pin 32 when the connection mechanisms 24L, 24R, 26L, 26R (see FIG. 1) are engaged. With reference to FIGS. 10 and 11, the anchor 34 can further include integrally formed upper and lower locking pin guide portions 38 that are each provided with axially aligned apertures 40 for receiving a locking pin 42. The anchor 34 can further include recessed regions 44 that define gripping fingers 46 on opposite sides of the C-shaped channel 36 for allowing the gripping fingers 46 to flex when the support pin 32 is inserted with or disengaged from the channel 36. The C-shaped channel 36 is designed to hold the support pins 32 of the tailgate panel 22 in an easy snap fit arrangement so that the operator's hands are free to engage or disengage the locking pins 42 without concern for the tailgate panel 22 falling away. The snap fit arrangement can be achieved by pressing the support pins 32 into the channels 36 and the snap fit arrangement can be overcome by pulling the tailgate panel 22 away from the bracket assembly 30 to cause the support pins 32 to disengage from the channels 36 when the locking pins 42 are in the disengaged position. The anchor 34 can further include mounting apertures 48 for receiving mounting fasteners 50 therein, as best shown in FIGS. 7 and 9.

As shown in FIGS. 10 and 11, the bracket assembly 30 can include a metal bracket 52 that includes a mounting portion 54 and upper and lower support portions 56 that support the anchor 34 therebetween. The mounting portion 54 includes a pair of mounting apertures 58 that align with the mounting apertures 48 of the anchor 34 for receiving the mounting fasteners 50, as best shown in FIGS. 7 and 9. The upper and lower support portions 56 further include apertures 60 that are aligned with the apertures 40 of the anchor 34 for supporting and guiding the locking pin 42 therein. In the engaged position of the connection mechanisms 24R, 26R, the locking pin 42 secures the support pins 32 within the channel 36 of the anchor 34. In the released position of the connection mechanisms 24R, 26R, the locking pin 42 is lifted away from the opening of the channel 36 and allows the support pins 32 to be inserted or removed from the channel 36. The locking pins 42 of the bracket assemblies 30 can be L-shaped and include a knob 42A to assist the user in easily moving the locking pin 42 between the engaged and released positions.

Figure 8:
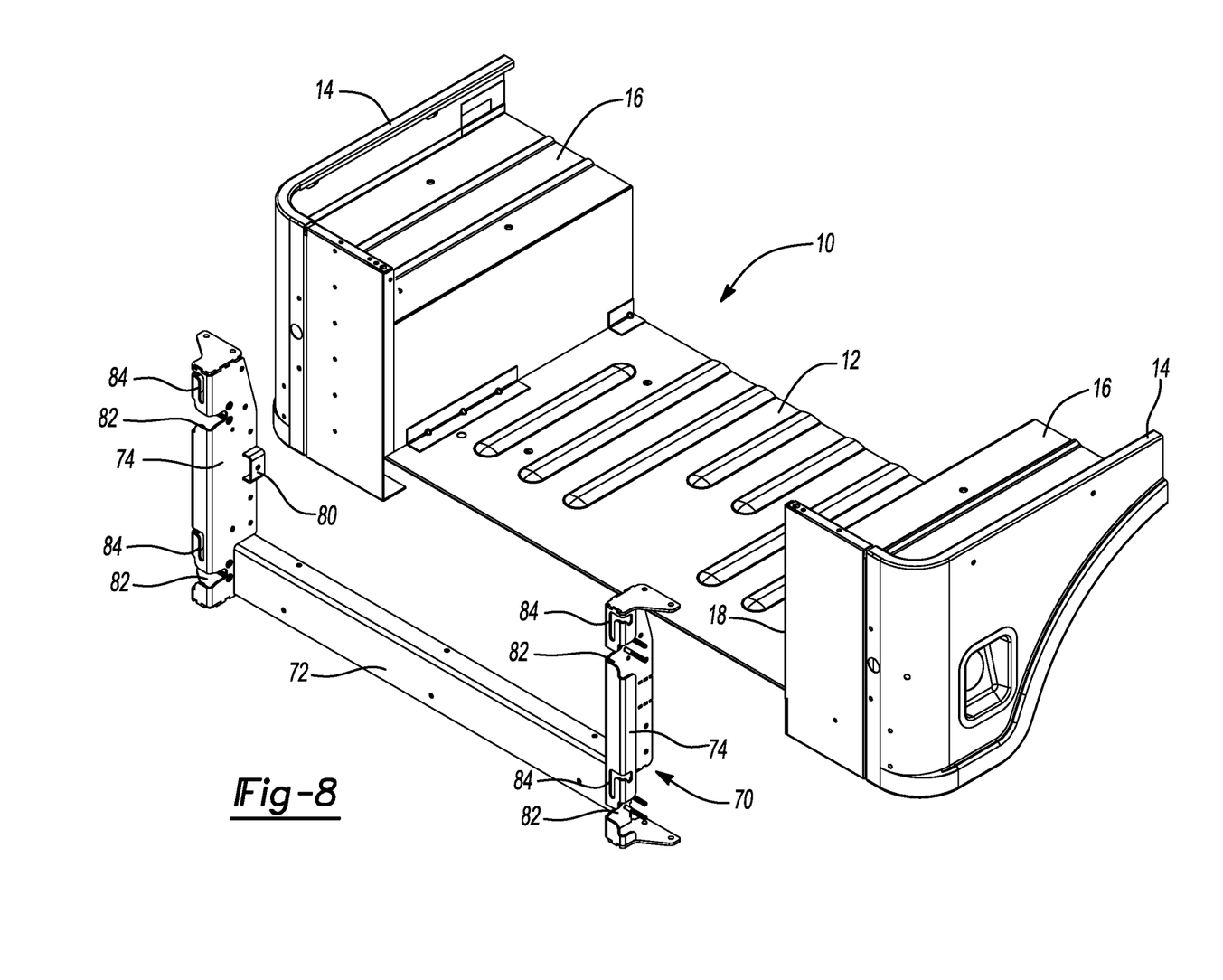
FIG. 8 is an exploded perspective view of the rear closeout subassembly according to the principles of the present disclosure.

Each of the bracket assemblies 30 (shown in FIG. 10) of the upper and lower connection mechanisms 24L, 24R, 26L, 26R can be supported by a rear closeout subassembly 70 that can be secured in the opening 18 between the sidewalls 14, as best shown in FIGS. 8 and 9. The rear closeout subassembly 70 can include a lower sill 72 and a pair of vertical supports 74. The lower sill 72 and vertical supports 74 can be welded or otherwise secured to the bed floor 12 and pair of sidewalls 14.

As best shown in FIG. 9, the vertical supports 74 can be made from sheet metal and can include a mounting plate portion 76 adapted to be secured to the sidewalls 14. The mounting plate portion 76 further includes mounting apertures 78 for receiving the fasteners 50 for supporting the bracket assemblies 30 of the upper and lower connection mechanisms 24L, 24R, 26L, 26R to the mounting plate portion 76. An additional spacer plate 80 can be secured to the mounting plate portion 76 such as by welding and can include an aperture for receiving an anchor for attachment to the tailgate assembly side cables 28.

The vertical supports 74 can further include a pair of access slots 82 that receive the support pins 32 to permit engagement with the bracket assemblies 30. The vertical supports 74 further define guide slots 84 that are generally inverted J-shaped and receive the locking pins 42 to allow the locking pins 42 to be moved from the engaged/locked position at the end of the longer leg portion 84A of the inverted J-shaped slot 84 and to support the locking pins 42 in the upward released position at the end of the shorter hook portion 84B of the inverted J-shaped slot 84. The vertical supports 74 can further include upper and lower support plates 86 that are welded to and reinforce the vertical supports 74 and provide a refined appearance.

It is noted that the connection mechanisms can be reversed so that the support pins 32 are supported by the sidewalls 14 and the bracket assemblies can be supported by the tailgate panel 22. In addition, alternative devices and arrangements can be utilized for securing the locking pins 42 in the released position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A cargo assembly, comprising:
a cargo area having a bed floor and a pair of sidewalls on opposite sides of the bed floor, the bed including an open end along an edge of the bed floor; and
a tailgate panel having a first side edge and a second side edge, the first and second side edges having an upper connection mechanism and a lower connection mechanism that are each releasably and pivotally engaged with the pair of sidewalls, wherein the tailgate panel is pivotable about the upper connection mechanism between a vertical position along the edge of the bed floor and a horizontal position disposed between the pair of sidewalls and directly above the bed,
wherein the upper connection mechanisms and the lower connection mechanisms include a support pin disposed on one of the tailgate panel and the pair of sidewalls and a bracket assembly disposed on the other of the tailgate panel and the pair of sidewalls,
wherein the support pin of the upper connection mechanisms and the lower connection mechanisms includes a reduced diameter portion disposed between opposite shoulders, the reduced diameter portion being received within an anchor of the corresponding bracket assembly.

2. The cargo assembly according to claim 1, wherein the anchor of each bracket assembly is made from plastic or an elastomer and defines a channel for receiving the support pins.

3. The cargo assembly according to claim 2, wherein the anchor includes a pair of fingers defining the channel and each of the bracket assemblies include a locking pin for releasably securing the support pin with the channel.

4. The cargo assembly according to claim 3, wherein the locking pin is received in a J-shaped guide slot having a first portion that receives the locking pin in an engaged position and a second portion that receives the locking pin in a disengaged position to allow removal of the support pin from the respective bracket assembly.

5. The cargo assembly according to claim 1, wherein the tailgate panel is operable in a plurality of positions including:
- a closed position with the upper connection mechanisms and the lower connection mechanisms in an engaged condition;
- an open position with the upper connection mechanisms in a disengaged condition and the lower connection mechanisms in an engaged condition;
- a spreader position with the upper connection mechanisms in an engaged condition and the lower connection mechanisms in a disengaged condition; and
- a removed position with the upper connection mechanisms in a disengaged condition and the lower connection mechanisms in a disengaged condition.

6. A cargo assembly, comprising:
- a cargo area having a bed floor and a pair of sidewalls on opposite sides of the bed floor, the bed including an open end along an edge of the bed floor; and
- a tailgate panel having a first side edge and a second side edge, the first and second side edges having an upper connection mechanism and a lower connection mechanism that are each releasably and pivotally engaged with the pair of sidewalls, wherein the tailgate panel is pivotable about the upper connection mechanism between a vertical position along the edge of the bed floor and a horizontal position disposed between the pair of sidewalls and directly above the bed, wherein the upper connection mechanisms and the lower connection mechanisms each include a support pin disposed on one of the tailgate panel and the pair of sidewalls and a bracket assembly disposed on the other of the tailgate panel and the pair of sidewalls, wherein the bracket assemblies of the upper connection mechanisms and the bracket assemblies of the lower connection mechanisms each include a locking pin to releasably retain the support pin of the upper connection mechanisms and the lower connection mechanisms within the respective bracket assembly of the upper connection mechanisms and the lower connection mechanisms.

7. The cargo assembly according to claim 6, wherein the locking pin of each bracket assembly is received in a J-shaped guide slot having a first portion that receives the locking pin in an engaged position and a second portion that receives the locking pin in a disengaged position to allow removal of the support pin from the respective bracket assembly.

8. The cargo assembly according to claim 6, wherein each bracket assembly includes an anchor including a generally C-Shaped channel shaped for receipt of the support pin.

9. The cargo assembly according to claim 8, wherein the anchor of each bracket assembly includes a pair of fingers defining the C-shaped channel.

10. The cargo assembly according to claim 6, wherein the tailgate panel is operable in a plurality of positions including;
- a closed position with the upper connection mechanisms and the lower connection mechanisms in an engaged condition;
- an open position with the upper connection mechanisms in a disengaged condition and the lower connection mechanisms in an engaged condition;
- a spreader position with the upper connection mechanisms in an engaged condition and the lower connection mechanisms in a disengaged condition; and
- a removed position with the upper connection mechanisms in a disengaged condition and the lower connection mechanisms in a disengaged condition.

11. A tailgate bracket assembly, comprising:
- a metal bracket having a mounting portion, an upper portion and a lower portion, each of the upper and lower portions being bent generally perpendicular relative to the mounting portion, the upper portion and the lower portion each including an aperture;
- a plastic or elastomeric anchor disposed between the upper portion and the lower portion of the metal bracket, the anchor including a channel disposed between the upper portion and the lower portion of the metal bracket; and
- a locking pin received in the aperture in the upper portion of the metal bracket and movable between an engaged position engaged with the aperture in the lower portion of the metal bracket and a disengaged position spaced from the aperture in the lower portion of the metal bracket,
- wherein the anchor further includes an upper arm and a lower arm each including an aperture aligned with the apertures in the upper and lower portions of the metal bracket.

12. The tailgate bracket assembly according to claim 11, wherein the mounting portion of the metal bracket and the anchor each include aligned mounting apertures therein.

13. A tailgate bracket assembly, comprising:
- a metal bracket having a mounting portion, an upper portion and a lower portion, each of the upper and lower portions being bent generally perpendicular relative to the mounting portion, the upper portion and the lower portion each including an aperture;
- a plastic or elastomeric anchor disposed between the upper portion and the lower portion of the metal bracket, the anchor including a channel disposed between the upper portion and the lower portion of the metal bracket; and
- a locking pin received in the aperture in the upper portion of the metal bracket and movable between an engaged position engaged with the aperture in the lower portion of the metal bracket and a disengaged position spaced from the aperture in the lower portion of the metal bracket, wherein the anchor includes a pair of fingers defining the channel and wherein the channel is generally C-shaped.

14. A cargo assembly, comprising:
- a cargo area having a bed floor and a pair of sidewalls on opposite sides of the bed floor, the cargo area including an open end along an edge of the bed floor;
- a pair of lower bracket assemblies mounted to a lower portion of each of the pair of sidewalls;
- a pair of upper bracket assemblies mounted to an upper portion of each of the pair of sidewalls;
- a tailgate body having a first side edge and a second side edge;
- a first pin extending from a lower portion of the first side edge of the tailgate body and adapted to be releasably and pivotally engaged with one of the pair of lower bracket assemblies;
- a second pin extending from an upper portion of the first side edge of the tailgate body and adapted to be releasably and pivotally engaged with one of the pair of upper bracket assemblies;
- a third pin extending from a lower portion of the second side edge of the tailgate body and adapted to be releasably and pivotally engaged with the other of the pair of lower bracket assemblies; and a fourth pin extending from an upper portion of the second side edge of the tailgate body and adapted to be releasably and pivotally engaged with the other of the pair of upper bracket assemblies, wherein the pair of lower bracket assemblies each include an anchor for receiving the first pin and the third pin respectively and the pair of upper bracket assemblies each include an anchor for receiving the second pin and the fourth pin, respectively, wherein the first pin, the second pin, the third pin and the fourth pin each include a reduced diameter portion disposed between opposite shoulders, the reduced diameter portion being received within the anchor of the pair of lower bracket assemblies and the upper bracket assemblies.

15. The cargo assembly according to claim 14, wherein the anchor of each of the pair of lower bracket assemblies and the upper bracket assemblies are made from a plastic or an elastomeric material.

16. The cargo assembly according to claim 14, wherein the anchor of each of the pair of lower bracket assemblies and the pair of upper bracket assemblies includes a generally C-Shaped channel.

17. The cargo assembly according to claim 14, wherein the tailgate panel is operable in a plurality of positions including;
a closed position with the pair of upper bracket assemblies and the pair of lower bracket assemblies in an engaged condition;
an open position with the pair of upper bracket assemblies in a disengaged condition and the pair of lower bracket assemblies in an engaged condition;
a spreader position with the pair of upper bracket assemblies in an engaged condition and the pair of lower bracket assemblies in a disengaged condition; and
a removed position with the pair of upper bracket assemblies in a disengaged condition and the pair of lower bracket assemblies in a disengaged condition.

18. A cargo assembly, comprising:
a cargo area having a bed floor and a pair of sidewalls on opposite sides of the bed floor, the cargo area including an open end along an edge of the bed floor;
a pair of lower bracket assemblies mounted to a lower portion of each of the pair of sidewalls;
a pair of upper bracket assemblies mounted to an upper portion of each of the pair of sidewalls;
a tailgate body having a first side edge and a second side edge;
a first pin extending from a lower portion of the first side edge of the tailgate body and adapted to be releasably and pivotally engaged with one of the pair of lower bracket assemblies;
a second pin extending from an upper portion of the first side edge of the tailgate body and adapted to be releasably and pivotally engaged with one of the pair of upper bracket assemblies;
a third pin extending from a lower portion of the second side edge of the tailgate body and adapted to be releasably and pivotally engaged with the other of the pair of lower bracket assemblies; and
a fourth pin extending from an upper portion of the second side edge of the tailgate body and adapted to be releasably and pivotally engaged with the other of the pair of upper bracket assemblies, wherein the pair of lower bracket assemblies and the pair of upper bracket assemblies each include a locking pin to releasably retain the first pin, the second pin, the third pin and the fourth pin within the respective ones of the pair of lower bracket assemblies and the pair of upper bracket assemblies.

19. The cargo assembly according to claim 18, wherein the locking pin of each of the pair of lower bracket assemblies and the pair of upper bracket assemblies is received in a J-shaped guide slot having a first portion that receives the locking pin in an engaged position and a second portion that receives the locking pin in a disengaged position to allow removal of one of the first pin, the second pin, the third pin and the fourth pin from the respective one of the pair of lower bracket assemblies and the pair of upper bracket assemblies.

20. The cargo assembly according to claim 19, wherein the locking pin of each of the pair of lower bracket assemblies and the pair of upper bracket assemblies extends in a vertical direction.

21. The cargo assembly according to claim 14, wherein the anchor of each bracket assembly includes a pair of fingers defining the generally C-shaped channel.

22. The cargo assembly according to claim 18, wherein the pair of lower bracket assemblies and the pair of upper bracket assemblies each include a bracket body made from steel and an anchor made from plastic or an elastomeric material, wherein the anchor further includes a pair of integrally formed guide bosses for supporting and guiding the locking pin.

23. The cargo assembly according to claim 18, wherein each locking pin is movable within a guide slot between an engaged position and a disengaged position.

\* \* \* \* \*